(12) United States Patent
Medico

(10) Patent No.: US 6,739,999 B2
(45) Date of Patent: May 25, 2004

(54) FLUID RECOVERY SYSTEM FOR AN AUTOMATIC TRANSMISSION UNIT

(75) Inventor: Giuseppe Medico, Rivoli (IT)

(73) Assignee: Magneti Marelli Powertrain S.p.A., Turin (IT)

(*) Notice: Subject to any disclaimer, the term of this patent is extended or adjusted under 35 U.S.C. 154(b) by 0 days.

(21) Appl. No.: 09/984,635

(22) Filed: Oct. 30, 2001

(65) Prior Publication Data
US 2002/0079256 A1 Jun. 27, 2002

(30) Foreign Application Priority Data
Oct. 31, 2000 (IT) .................... TO2000A1029

(51) Int. Cl.$^7$ .......................... F16H 31/00; F16D 31/02
(52) U.S. Cl. .................... 475/136; 137/565.37
(58) Field of Search .............. 475/127, 129, 475/136; 192/3.51; 137/565.34, 565.37, 207; 184/6.12

(56) References Cited

U.S. PATENT DOCUMENTS

| | | | |
|---|---|---|---|
| 3,003,659 A | * 10/1961 | Miller | 137/207 X |
| 4,010,660 A | * 3/1977 | Ahlen | 475/136 X |
| 4,782,851 A | * 11/1988 | Malik | 137/565.37 X |
| 5,105,922 A | * 4/1992 | Yant | 192/3.58 |
| 5,882,273 A | * 3/1999 | Jang | 475/129 |
| 5,901,744 A | * 5/1999 | Richards | 137/568 |
| 6,332,855 B1 | * 12/2001 | Murasugi | 475/116 |

FOREIGN PATENT DOCUMENTS

| | | |
|---|---|---|
| DE | 198 56 941 | 2/2000 |
| EP | 0 644 370 | 3/1995 |

OTHER PUBLICATIONS

Patent Abstracts of Japan, vol. 2000, No. 12, Jan. 3, 2001 (JP 2000 257705, Sep. 19, 2000).
Patent Abstract of Japan, vol. 012, No. 064, Feb. 26, 1988 (JP 62 209268, Sep. 14, 1987).

* cited by examiner

Primary Examiner—Roger Pang
(74) Attorney, Agent, or Firm—Steptoe & Johnson LLP; D. Douglas Price

(57) ABSTRACT

A fluid recovery system for an automatic transmission unit of a vehicle, provided with a tank containing a fluid, a hydraulic circuit receiving this fluid from the tank, an electrovalve unit supplied by the hydraulic circuit and adapted to control actuator units in order to actuate the opening and closing of a clutch and to perform the selection and engagement/disengagement of the gears of a gear change, the system comprising at least one collection zone adapted to recover the fluid escaping from the actuator units and at least one duct connecting the collection zone to the tank so that the fluid recovered in the collection zone can be returned to the tank.

7 Claims, 4 Drawing Sheets

FLUID RECOVERY SYSTEM FOR AN AUTOMATIC TRANSMISSION UNIT

The present invention relates to a fluid recovery system for an automatic transmission unit.

BACKGROUND OF THE INVENTION

Automatic transmission units for vehicles, in particular automobile vehicles, are known in which the clutch and the gear change of the vehicle are associated with actuators used respectively for the opening/closing of the clutch and/or the selection and engagement/disengagement of the gears.

The above-mentioned actuators are generally of hydraulic or electro-hydraulic type and are supplied by means of a hydraulic pump receiving an operating fluid (normally oil) from a hydraulic circuit which is coupled to the actuators and is adapted to provide these actuators with the pressurised operating fluid so that they can operate.

During the normal operation of automatic transmission units, there may be leakages of operating fluid from the actuators because the gaskets present in these actuators are not fully leak-tight; this lack of leak-tightness may in particular be caused by damage to or wear of the gaskets.

This situation may cause fluid to escape from the hydraulic circuit causing a possible malfunction of the automatic transmission unit and pollution of the external environment; when the quantity of operating fluid escaping from the circuit as a result of leakages is a substantial proportion, for instance 20–30%, of the volume of the operating fluid in the hydraulic circuit, operating anomalies may occur as a result, for instance, of the intake of air or other gases by the pump.

A known solution is to provide the hydraulic actuators with high quality gaskets so as to reduce fluid leakages to predetermined values.

This solution has the drawback that it is particularly costly and does not make it possible to recover the fluid that has leaked.

SUMMARY OF THE INVENTION

The object of the present invention is therefore to provide an operating fluid recovery system for a transmission unit which is free from the above-mentioned drawbacks.

The present invention relates to an operating fluid recovery system for a transmission unit as described in claim 1.

BRIEF DESCRIPTION OF THE DRAWINGS

The present invention will be described below with reference to the accompanying drawings, which a non-limiting embodiment thereof, in which.

DETAILED DESCRIPTION OF THE INVENTION

Figure 1:
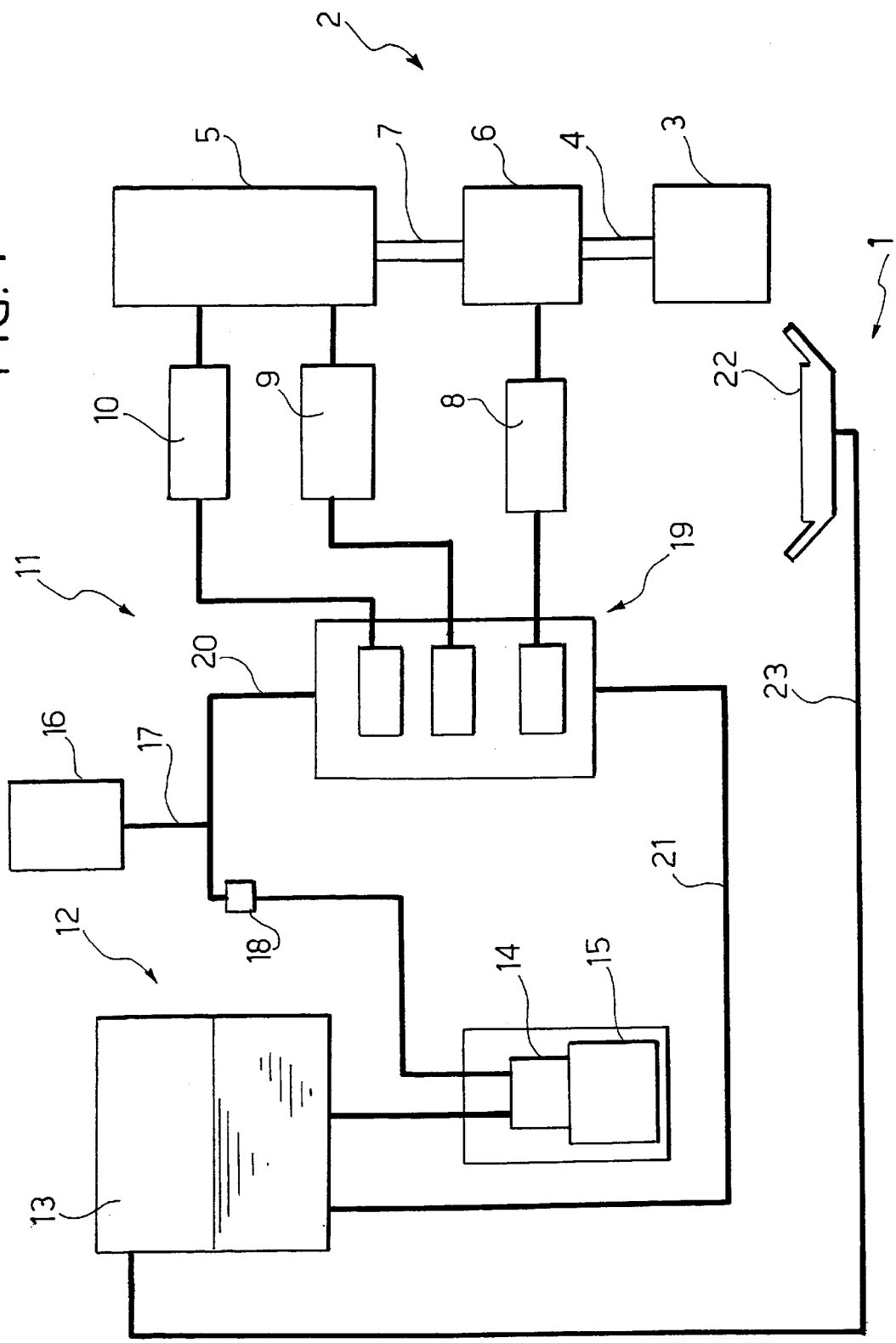
FIG. 1 is a diagram of a first embodiment of a fluid recovery system for an automatic transmission unit in accordance with the present invention.

In FIG. 1, a fluid recovery system for an automatic transmission unit 2 cooperating with an engine 3, for instance an internal combustion engine or an electrical engine (shown diagrammatically) of a vehicle (not shown), is shown overall by 1.

The engine 3 supplies mechanical power via an output shaft 4 to the transmission unit 2 comprising a gear change 5 and a clutch 6 interposed between the output shaft 4 of the engine 3 and an input shaft 7 of the gear change 5.

The clutch 6 is in particular associated with a first actuator unit 8 causing the clutch 6 to open and close, and the gear change 5 is associated with a second and a third actuator unit 9, 10 in order to control the selection and the engagement/disengagement of the gears of the gear change 5 respectively.

The first, second and third actuator units 8, 9, 10 receive pressurised operating fluid (for instance oil) from a hydraulic circuit 11.

The hydraulic circuit in particular comprises:

a source 12 of operating fluid formed by a tank 13 containing a fluid and a gas, for instance air;

a pump 14 actuated by an electric motor 15 and receiving as input the operating fluid from the tank 13;

a fluid collector 16 receiving as input, via a supply duct 17 and a one-way valve 18, the fluid from the pump 14 in order to keep the hydraulic circuit 11 pressurised;

an electrovalve unit 19 receiving as input, via a supply duct 20, the pressurised operating fluid supplied as output from the collector 16 in order to supply the first, second and third actuator units 8, 9, 10;

a recycling duct 21 extending between a recycling output of the valve unit 19 and an input of the tank 13.

The system 1 further comprises a collection zone 22, for instance a dedicated tank or a built-in tank adapted to collect the fluid escaping from the first and/or second and/or third actuator units 8, 9, 10, and a recovery duct 23 connecting the collection zone 22 to the upper end of the tank 13 so that the fluid in the collection zone 22 can be returned to the tank 13. The collection zone 22 may in particular be shaped as a tank disposed adjacent and below the first and/or second and/or third actuator unit 8, 9, 10, in order to collect operating fluid leaking from the actuators and reaching, under the effect of gravity, the collection zone 22. A plurality of collection zones (not shown) may also be provided and associated respectively with the first, second and third actuator units 8, 9, 10 with outlets that flow into the duct 23.

The collection zone 22 is preferably but not exclusively disposed at a height lower than the height at which the tank 13 is disposed.

Fluid is returned by means of a reduction of the pressure of the gas in the tank 13 caused by the actuation of one of the actuator units 8, 9, 10. For instance, during an opening phase of the clutch 6, the first actuator unit 8 is actuated in a first direction, this actuation causing a reduction of the volume of the fluid in the tank 13 and therefore, since the tank 13 is closed, a reduction of the pressure of the gas in this tank 13.

When the pressure of the gas in the tank 13 is lower than the external ambient pressure, the fluid collected in the collection zone 22 is subject to a pressure difference which causes this fluid to pass through the recovery duct 23 from the collection zone 22 to the tank 13.

The operation to return the fluid ends when equilibrium is reached between the external ambient pressure and the pressure of the gas in the tank 13. In this condition, a quantity of fluid whose volume is equal to the internal volume of the recovery duct remains within the recovery duct.

If, however, the clutch 6 is closed, the first actuator unit 8 is actuated in the direction opposite to the previous direction causing an increase in the volume of working fluid in the tank 13 and therefore an increase in the pressure of the gas in this tank 13. If the pressure of the gas in the tank is higher than or equal to the external ambient pressure, the operating fluid in the recovery duct 23 escapes from the latter to the collection zone 22.

It will be appreciated that by providing the recovery duct 23 with suitable dimensions, for instance by reducing its overall volume, the quantity of fluid returned to the collection zone 22 via the recovery duct 23 can be made negligible.

Figure 2:
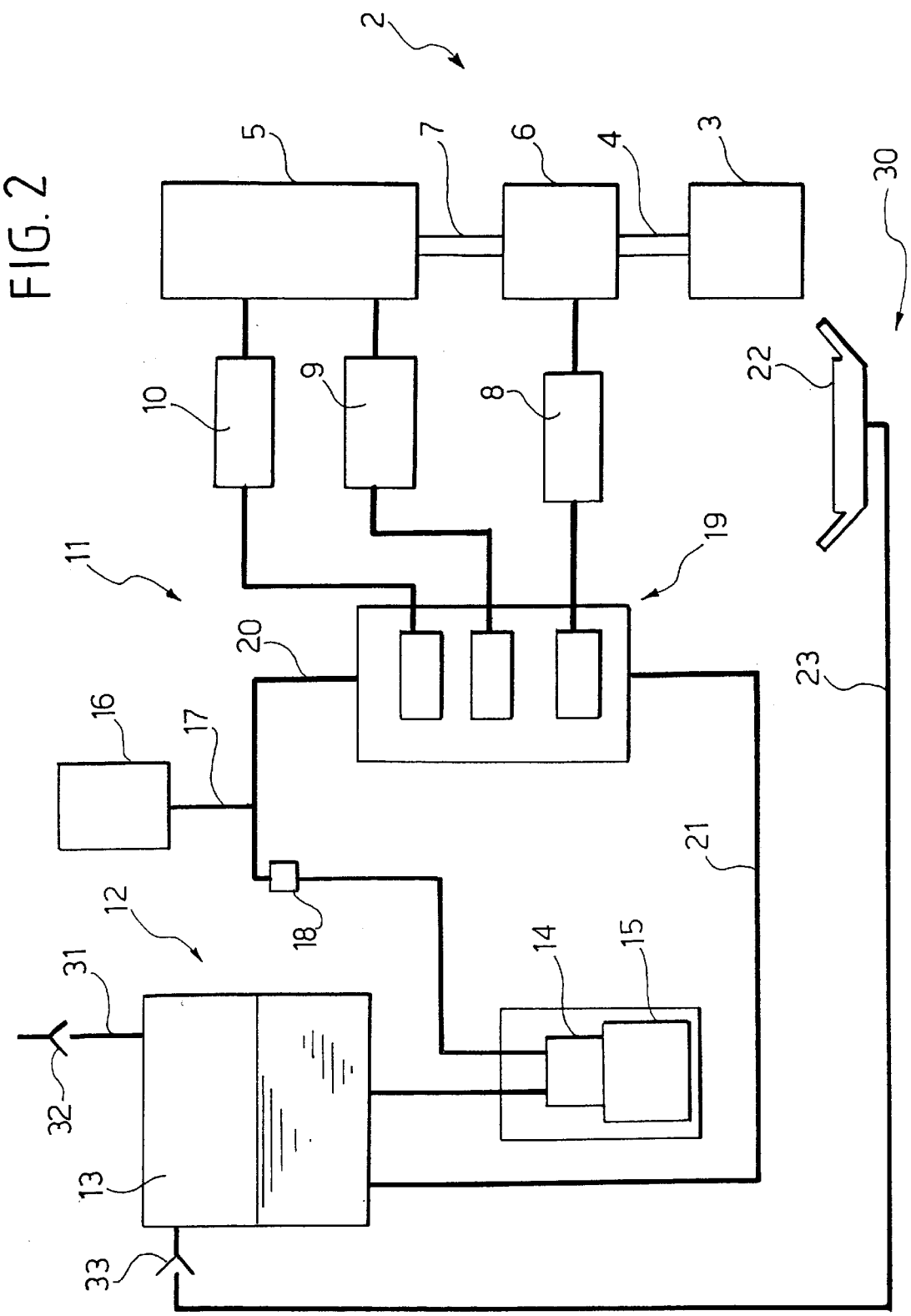
FIG. 2 is a diagram of a variant of the first embodiment of the transmission fluid recovery system of FIG. 1.

In FIG. 2, a second embodiment of a fluid recovery system for transmission units is shown overall by 30 and is similar to the system 1 described above. Components of this second embodiment corresponding to those of the system 1 will bear the same reference numerals in the following description.

The system 30 in particular comprises a vent duct 31 connected at the upper end of the tank 13, and a first one-way valve 32 mounted on the vent duct 31 externally to the tank 13 in order to enable a one-way exchange of the gas in the tank 13 with the external atmosphere; the first valve 32 is in particular adapted to prevent the gas from flowing back into the tank 13 and to enable the gas to flow externally from the tank 13 when the external ambient pressure is lower than the pressure of the gas in the tank 13.

The system 30 further comprises a second one-way valve 33 interposed between the recovery duct 23 and the tank 13 and adapted to prevent the operating fluid from flowing back from the recovery duct 23 to the collection zone 22 when the pressure of the gas in the tank 13 is greater than the external ambient pressure; the second valve 33 is also adapted to move into an open position to enable operating fluid to be returned to the tank 13 when the pressure to which the operating fluid in the collection zone 22 is subject is greater than the pressure of the gas in the tank 13.

In this case as well the fluid in the collection zone 22 is returned to the tank 13 by generating a low pressure in this tank 13; this low pressure is in particular generated by the variations of the volume of the operating fluid in the tank 13 due to the recycling of the operating fluid within the hydraulic circuit during the actuation of the pump 14 or the actuator units 8, 9, 10.

For instance, during a phase of closure of the clutch 6 the first actuator unit 8 is actuated causing an increase in the volume of fluid in the tank 13 and therefore an increase in the pressure of the gas in this tank 13.

If the pressure of the gas exceeds the external ambient pressure, the gas is caused to escape from the tank 13 via the first one-way valve 32.

In this case, and in contrast to the case described above with respect to the first embodiment, the second one-way valve 33 prevents any fluid in the recovery duct 23 from flowing into the collection zone 22.

If the clutch 6 is subsequently opened, the first actuator unit 8 is actuated and moves in a direction opposite to the previous closing direction, causing a decrease in the volume of fluid in the tank 13. Since the first one-way valve 32 prevents air from flowing back from the external environment into the tank 13, a low pressure is created in the tank 13 which promotes the return of the operating fluid from the collection zone 22 to the interior of the tank 13.

It will be appreciated that the low pressure of the gas in the tank is also generated when, as a result of a pressure drop in the hydraulic circuit, the pump 14 is actuated to supply the hydraulic collector 16. In this case, the pump 14 supplies the hydraulic collector 16 receiving the operating fluid from the tank 13 in which the volume of operating fluid is reduced, thereby generating a reduction of the gas pressure.

Figure 3:
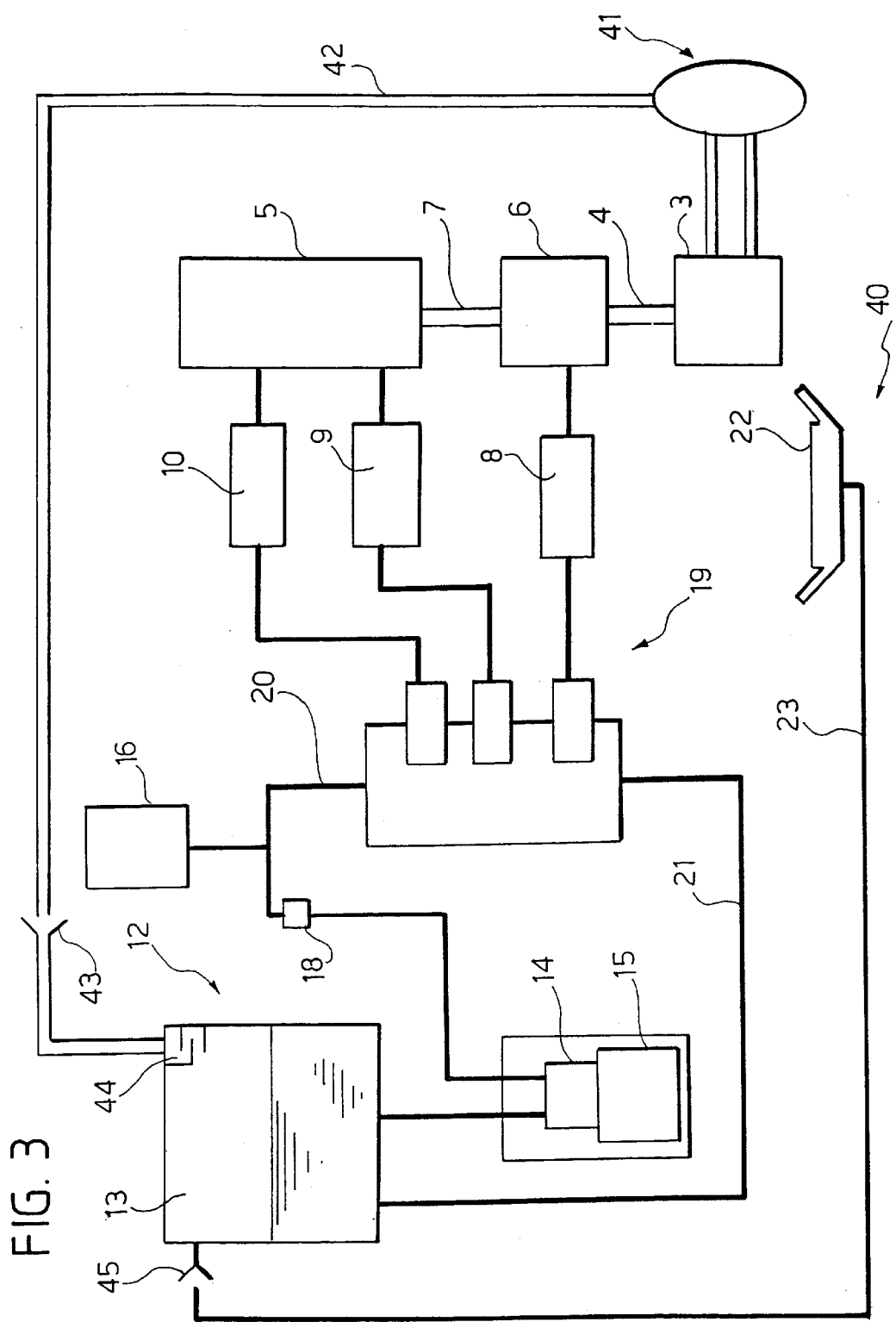
FIG. 3 is a diagram of a second embodiment of a fluid recovery system for a transmission unit.

In FIG. 3, a third embodiment of a fluid recovery system for transmission units is shown overall by 40 and is similar to the system 1 described above. Components of this third embodiment corresponding to those of the system 1 will bear the same reference numerals in the following description.

The system 40 comprises a zone 41 in which a low pressure is generated (low pressure zone); this zone may be formed, for instance, by a plurality of intake ducts of the engine 3 or by a circuit of a low-pressure servo-brake of the vehicle (not shown).

The system 40 further comprises a low pressure duct 42 which connects, via a first one-way valve 43, the low pressure zone 41 and the upper end of the tank 13, which is provided with a separator baffle 44 disposed at the location of the connection between the low pressure duct 42 and the tank 13 to prevent the fluid in the tank 13 from escaping from this tank 13 and reaching the low pressure zone 41 via the low pressure duct 42.

The system 40 lastly comprises a second one-way valve 45 connected to an end of the recovery duct at the location of the tank 13 and adapted to prevent the fluid from escaping from the recovery duct 23 into the collection zone 22.

In the system 40, the fluid is also returned from the collection zone 22 to the tank 13 by means of a low pressure generated by the low pressure zone 41 within the tank 13.

The connection between the low pressure zone 41 and the tank 13, provided via the low pressure duct 42, causes the maintenance of a gas pressure within the tank 13 whose value is lower than the external ambient pressure, Therefore, in this case as well, the fluid in the collection zone 22 is subject to a pressure difference which causes the operating fluid to return from the collection zone 22 to the tank 13. In this case, the tank 13 is always kept at low pressure irrespective of the direction of operation of the actuator units 8, 9 and 10.

Figure 4:
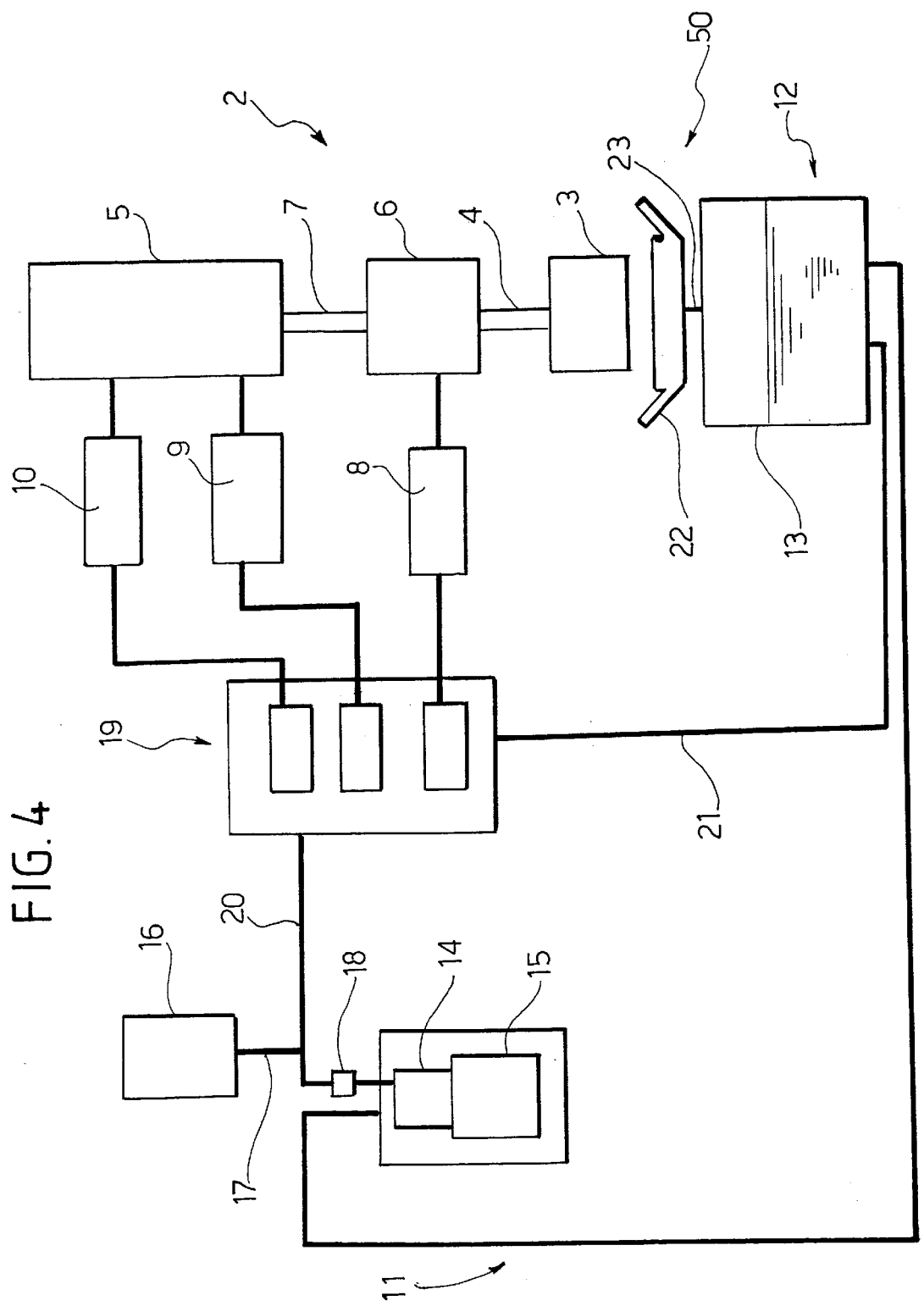
FIG. 4 is a diagram of a third embodiment of a fluid recovery system for a transmission unit.

In FIG. 4, a fourth embodiment of a fluid recovery system for transmission units is shown overall by 50 and is similar to the system 1 described above. Components of this fourth embodiment corresponding to those of the system 1 will bear the same reference numerals in the following description.

In this case, the tank 13 is disposed at a height which is lower than that of the collection zone 22, such that the fluid is returned from the collection zone 22 to the tank 13 via the recovery duct 23 chiefly under the effect of gravity.

The operation of the recovery system can be readily understood from the above description and requires no further explanation.

The present system has the advantage that it is economic, simple to produce and ensures that the transmission unit operates even when there are leakages of fluid from the actuators as a result of damage to the gaskets. The above-described system therefore enables the use of low-cost gaskets without the need for frequent resealing operations.

It will be appreciated that the system described and illustrated here may be modified and varied without departing from the scope of the present invention.

What is claimed is:

1. A fluid recovery system for an automatic transmission unit of a vehicle, which system comprises a tank containing a fluid, a hydraulic circuit receiving the fluid from the tank, an electrovalve unit supplied by the hydraulic circuit and adapted to control actuator units in order to actuate the opening and closing of a clutch and to perform the selection and engagement/disengagement of gears of a gear change, wherein the system comprises at least one collection means adapted to recover fluid escaping from the actuator units and at least one duct means connecting the collection means to the tank so that the fluid recovered in the collection means can be returned to the tank.

2. The fluid recovery system for a transmission unit as claimed in claim 1, wherein the fluid is returned by means of a variation of the pressure of a gas contained in the tank.

3. The fluid recovery system for a transmission unit as claimed in claim 2, wherein the variation of the gas pressure is generated following the operation of at least one of the actuator units.

4. The fluid recovery system for a transmission unit as claimed in claim 2, wherein the variation of the gas pressure is generated following the variation of the volume of operating fluid in the collection means.

5. The fluid recovery system for a transmission unit as claimed in claim 1, wherein the collection means comprises a tank.

6. A fluid recovery system for an automatic transmission unit of a vehicle, which system comprises a tank containing a fluid, a hydraulic circuit receiving the fluid from the tank, an electrovalve unit supplied by the hydraulic circuit and adapted to control actuator units in order to actuate the opening and closing of a clutch and to perform the selection and engagement/disengagement of gears of a gear change, wherein the system comprises at least one collection means adapted to recover fluid escaping from the actuator units and at least one duct means connecting the collection means to the tank so that the fluid recovered in the collection means can be returned to the tank, wherein the fluid is returned by means of a variation of the pressure of a gas contained in the tank, wherein the variation of the gas pressure is generated following the operation of at least one of the actuator units, and wherein the system comprises first one-way valve means coupled to the tank and adapted to enable the output of gas from the tank and to prevent gas from flowing back into the tank.

7. A fluid recovery system for an automatic transmission unit of a vehicle, which system comprises a tank containing a fluid, a hydraulic circuit receiving the fluid from the tank, an electrovalve unit supplied by the hydraulic circuit and adapted to control actuator units in order to actuate the opening and closing of a clutch and to perform the selection and engagement/disengagement of gears of a gear change, wherein the system comprises at least one collection means adapted to recover fluid escaping from the actuator units and at least one duct means connecting the collection means to the tank so that the fluid recovered in the collection means can be returned to the tank, wherein the fluid is returned by means of a variation of the pressure of a gas contained in the tank, wherein the variation of the gas pressure is generated following the operation of at least one of the actuator units, and wherein the system comprises second one-way valve means coupled to the duct means to enable fluid to flow to the tank and to prevent fluid from flowing back from the tank to the collection means.

* * * * *